(12) United States Patent
Dunbar

(10) Patent No.: US 7,100,935 B1
(45) Date of Patent: Sep. 5, 2006

(54) FIFTH WHEEL HITCH DEVICE WITH PIVOTAL LOCKING RAMP

(76) Inventor: Michael C. Dunbar, 2939 NW. Sterling, Norman, OK (US) 73072

( * ) Notice: Subject to any disclaimer, the term of this patent is extended or adjusted under 35 U.S.C. 154(b) by 250 days.

(21) Appl. No.: 10/864,067

(22) Filed: Jun. 8, 2004

(51) Int. Cl.
B62D 53/06 (2006.01)

(52) U.S. Cl. ........................................ 280/433; 280/432

(58) Field of Classification Search ........ 280/432–437, 280/441.1, 477, 507, 508, 438.1
See application file for complete search history.

(56) References Cited

U.S. PATENT DOCUMENTS

| | | | |
|---|---|---|---|
| 3,823,960 | A | 7/1974 | Boggs |
| 5,839,745 | A | 11/1998 | Cattau |
| 6,170,850 | B1 | 1/2001 | Works |
| 6,170,851 | B1 | 1/2001 | Lindenman |
| 6,213,492 | B1 | 4/2001 | Ceccarelli, III |
| 6,491,317 | B1 | 12/2002 | Breese |
| 6,547,270 | B1 | 4/2003 | Breese |
| 6,695,337 | B1 | 2/2004 | Breese |

2004/0070170 A1 * 4/2004 Lindenman et al. ........ 280/433

OTHER PUBLICATIONS

RBW Fifth Wheel Hitch, Little Rocker. pp. 1-3, http://www.ppl.motorhomes.com/parts/rv-hitches/94-1116.htm, May 13, 2004.
Li'L Rocker Fifth Wheel Hitch System; Hitch System Installation Instructions and User Guide. pp. 1-27, May 13, 2004, http://www.rbwindustries.com/lil%20rocker%20ims.htm.
X-16 Installation Instructions. pp. 1-21 http://www.rbwindustries.com/X16inshtml.html, May 13, 2004.

* cited by examiner

Primary Examiner—Anne Marie Boehler
(74) Attorney, Agent, or Firm—Randal D. Homburg

(57) ABSTRACT

A improved detachable fifth wheel hitch device with a pivotal locking ramp, which replaces a supplied fifth wheel hitch plate device attached to a truck or pickup mounted fifth wheel hitch base, provides an extended collar hitch plate above a kingpin receiver channel incorporating a pivotal locking ramp directing a kingpin into the kingpin receiver channel, over the pivotal locking ramp during loading, the pivotal locking ramp returning to an erect position, blocking removal of the kingpin once past the pivotal locking ramp unless the kingpin is raised vertically out of the kingpin receiver channel, thus preventing unintentional release of the kingpin from the kingpin receiver channel during loading, unloading or transport.

3 Claims, 7 Drawing Sheets

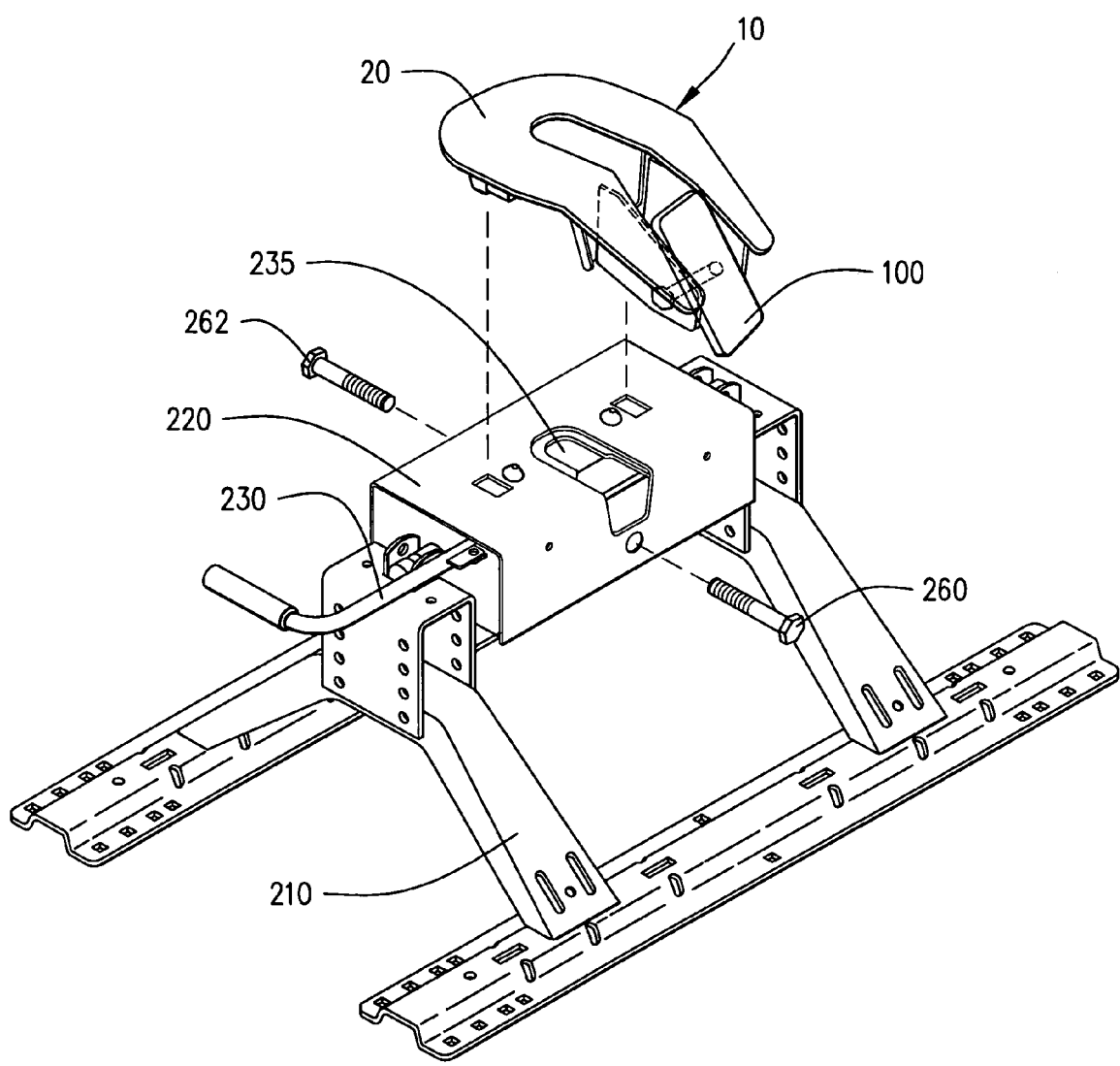
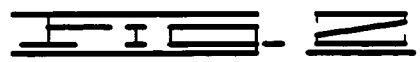

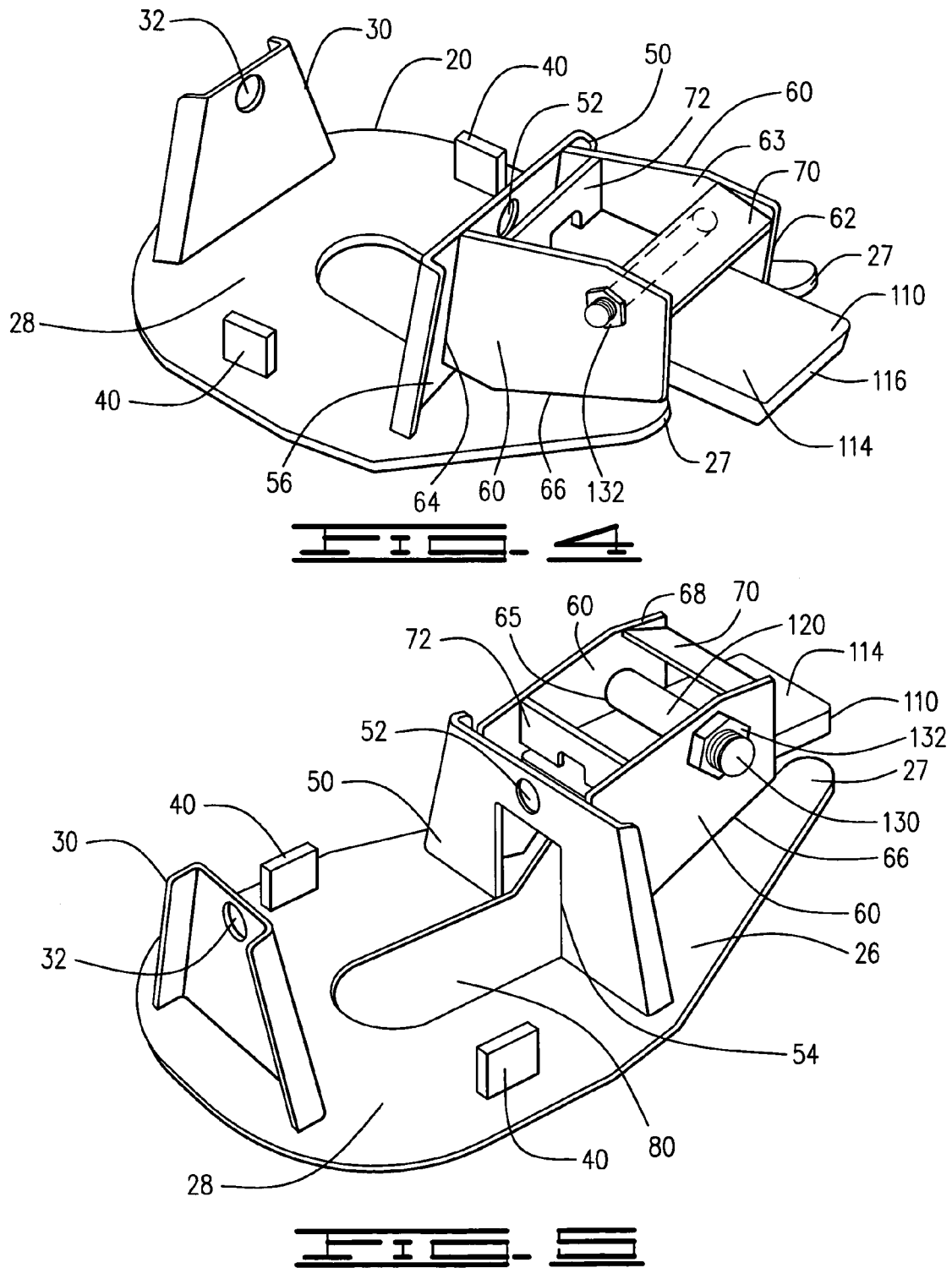

FIFTH WHEEL HITCH DEVICE WITH PIVOTAL LOCKING RAMP

CROSS REFERENCE TO RELATED APPLICATIONS

None

I. BACKGROUND OF THE INVENTION

1. Field of Invention

A improved detachable fifth wheel hitch device with a pivotal locking ramp, which replaces a supplied fifth wheel hitch plate device attached to a truck or pickup mounted fifth wheel hitch base, provides an extended collar hitch plate above a kingpin receiver channel incorporating a pivotal locking ramp directing a kingpin into the kingpin receiver channel, over the pivotal locking ramp during loading, the pivotal locking ramp returning to an erect position, blocking removal of the kingpin once past the pivotal locking ramp unless the kingpin is raised vertically out of the kingpin receiver channel, thus preventing unintentional release of the kingpin from the kingpin receiver channel during loading, unloading or transport.

2. Description of Prior Art

The following United States patents were discovered and are disclosed within this application for utility patent. All relate to fifth wheel kingpin securing devices. This inventor has two previous U.S. patents dealing with fifth wheel hitches and catches for kingpins, U.S. Pat. Nos. 6,491,317 and 6,695,337 to Breese and Dunbar In '317 to Breese, a device for retaining a kingpin outside the fifth wheel hitch when the kingpin becomes accidentally disengaged from the kingpin included a bar and kingpin catch that attached to a fifth wheel hitch outside and below the opening of the fifth wheel hitch. Breese '337 provides a pivotal locking mechanism, attaching within the opening of the fifth wheel hitch. It is pivotally engaged, providing an angled ramp which allows for the kingpin to ride up the ramp, the ramp teetering at a pivot point, providing a more elevated block to the fifth wheel hitch opening than in the inventor's prior patents. This pivotally locking device is distinguishable mainly in the pivotal ramp, being a part which moves in relation to the fifth wheel hitch as opposed to the previous devices being fixed devices.

As referenced in the disclosed patent, the supplied hitch plate assembly (250) which attached to the cross member locking assembly (220) is best depicted in U.S. Pat. No. 6,170,851 to Lindenman, also the cross member locking assembly (220) and supplied hitch plate assembly (250) indicated in FIG. 1 as the prior art. The front and rear bolts (Lindenman 28) are the front bolt (260) and rear bolt (262) referenced in the drawings.

In another U.S. Pat. No. 6,547,270 to Breese, a fixed ramp is located in the kingpin receiver channel which causes the kingpin to ride up and over the fixed ramp, dropping behind the fixed ramp, blocking release of the kingpin from the kingpin receiver channel. Other patents of relevance include U.S. Pat. No. 6,213,492 to Ceccarelli, III, disclosing a fifth wheel hitch attaching to an underlift T-bar mechanism, wherein a fifth wheel hitch may be installed in a box hitch of a vehicle to tow a fifth wheel trailer. A lock mechanism is disclosed in U.S. Pat. No. 5,839,745 to Cattau and U.S. Pat. No. 3,823,960 to Boggs, which provide a secondary lock for retaining the fifth wheel pin within the locking plate of the fifth wheel hitch.

II. SUMMARY OF THE INVENTION

There are a number of fifth wheel hitch devices on the market which allow for the attachment of trailers having a fifth wheel kingpin. They are supplied by different companies and marketed by RBW Hitch and other companies. The specific fifth wheel hitch which the improved detachable fifth wheel hitch device with a pivotal locking ramp is intended to improve upon and replace is indicated specifically to RBW's LI'L Brute™, RBW's LI'L Rocker™, and RBW's X16, and possibly others of similar embodiments. This particular type hitch, indicated as "Prior Art" in FIG. 1 of the drawings below, features a tilting and detachable fifth wheel hitch plate assembly, in some cases referenced as a "table top" plate, secured onto a base frame cross member containing the locking mechanism, by two bolts, with the base frame remaining attached within the bed of the pickup securing the base frame cross member. It is this particular type hitch the improved detachable fifth wheel hitch plate device with a pivotal locking ramp replaces the supplied detachable fifth wheel hitch plate assembly.

The improved detachable fifth wheel hitch device with a pivotal locking ramp comprises a removable fifth wheel hitch plate assembly having an extended collar of the fifth wheel hitch plate, attaching to the base frame cross member attached to a base frame. Unlike the prior art pivot pin lock for fifth wheel hitch, Breese '337, the improved detachable fifth wheel hitch device with a pivotal locking ramp is not installed into a kingpin receiver channel of a fixed fifth wheel hitch assembly or even a detachable fifth wheel hitch assembly, requiring permanent modification to the supplied fifth wheel hitch assembly. Installation of pivotal pin lock in Breese '337 would still be required for fifth wheel hitches that do not have a removable or detachable supplied fifth wheel hitch plate assembly.

The current device provides an improved fifth wheel hitch plate with two extended collars terminating at the base portion of the pivotal locking ramp urging the kingpin being loaded onto and over the ramp preventing the kingpin from being halted or deflected off the ramp during loading, resulting in an improper loading of the kingpin within the improved detachable fifth wheel hitch device with a pivotal locking ramp. It is specifically designed for fifth wheel hitches that have detachable fifth wheel hitch plate assemblies.

Manufacture of the device and integration of the device are improved from the standpoint that a common fifth wheel hitch which was already purchased and installed in a consumer's pickup may be upgraded with the improved device without having to permanently alter the factory supplied product. Installation of the current improved detachable fifth wheel hitch device with a pivotal locking ramp requires a replacement of the supplied fifth wheel hitch plate assembly accompanying the original product. This replacement is performed by simple removal of two bolts, and replacement of the supplied fifth wheel hitch plate with the current hitch plate device, with re-engagement of the two bolts to connect the current hitch plate device to the installed base. The supplied fifth wheel hitch plate device is set aside and may be reinstalled at any time.

The primary objective of the device is to provide an improved hitch plate device replacing a supplied fifth wheel hitch plate assembly, the improved hitch plate device having a pivotal locking ramp in front of and below an extended collar fifth wheel hitch plate.

A second objective is to provide the improved device with the pivotal locking ramp adapted to replace a detachable supplied hitch plate assembly provided with a cross-member support and mounting base of a pickup bed mounted fifth wheel hitch with out having to permanently alter or modify any portion of the fifth wheel hitch.

A third objective of the device is to provide the improved hitch plate device with the extended collar fifth wheel hitch plate to promote proper loading of the kingpin of a fifth wheel trailer within the improved hitch plate device over the pivotal locking ramp located between the two extended collar portions which extend down to the lower portion of the pivotal locking ramp.

III. DESCRIPTION OF THE DRAWINGS

The following drawings are submitted with this utility patent application.

FIG. 2 is the same perspective view indicating the application of the detachable fifth wheel hitch plate device with a pivotal locking ramp to the fifth wheel hitch base and the cross member, replacing the supplied hitch plate assembly.

FIG. 4 is a front lower perspective view of the detachable fifth wheel hitch plate device with a pivotal locking ramp.

FIG. 5 is a rear lower perspective view of the detachable fifth wheel hitch plate device with a pivotal locking ramp.

Figure 8A:
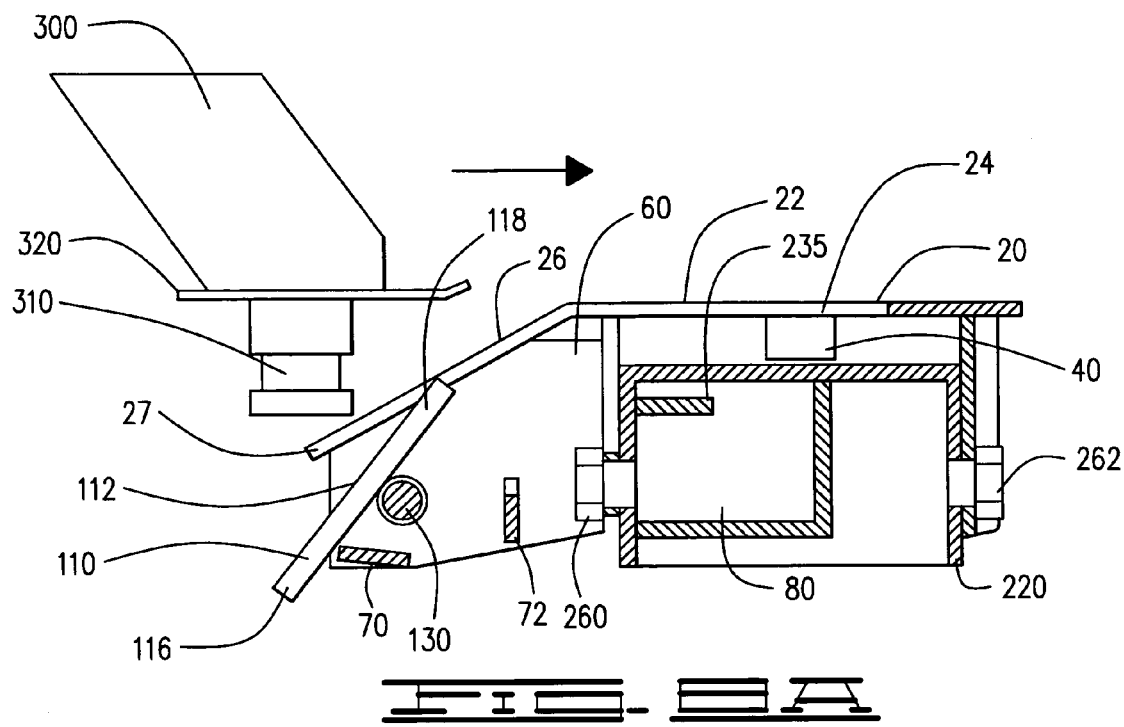
Figure 8B:
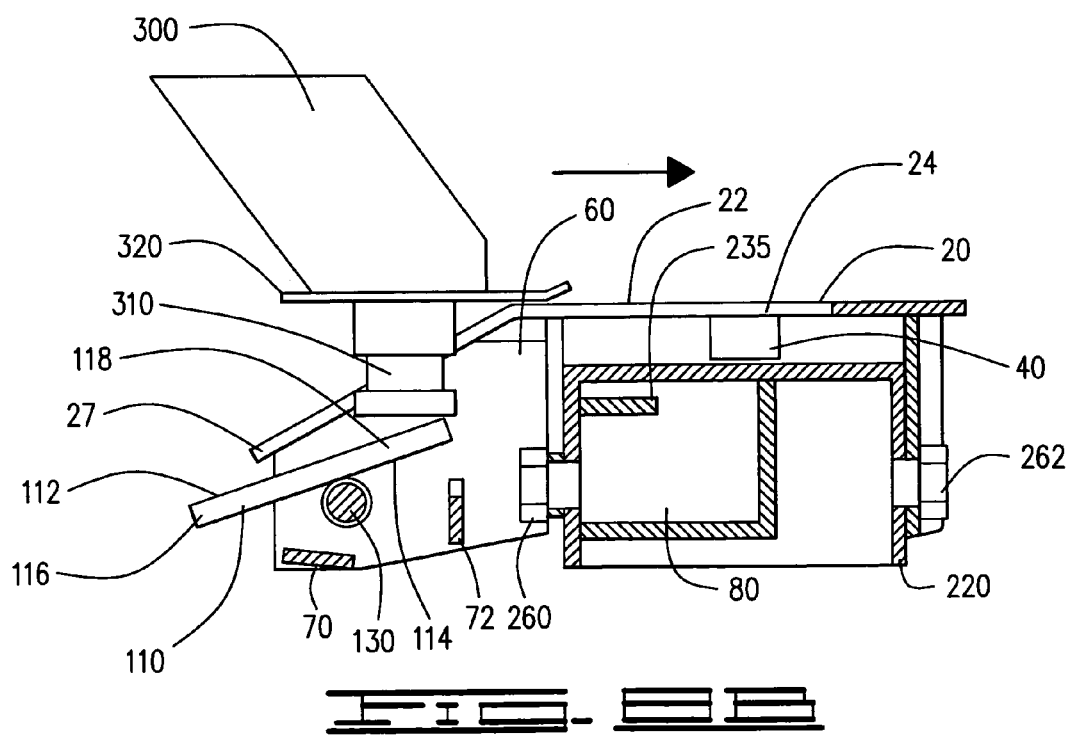
Figure 8C:
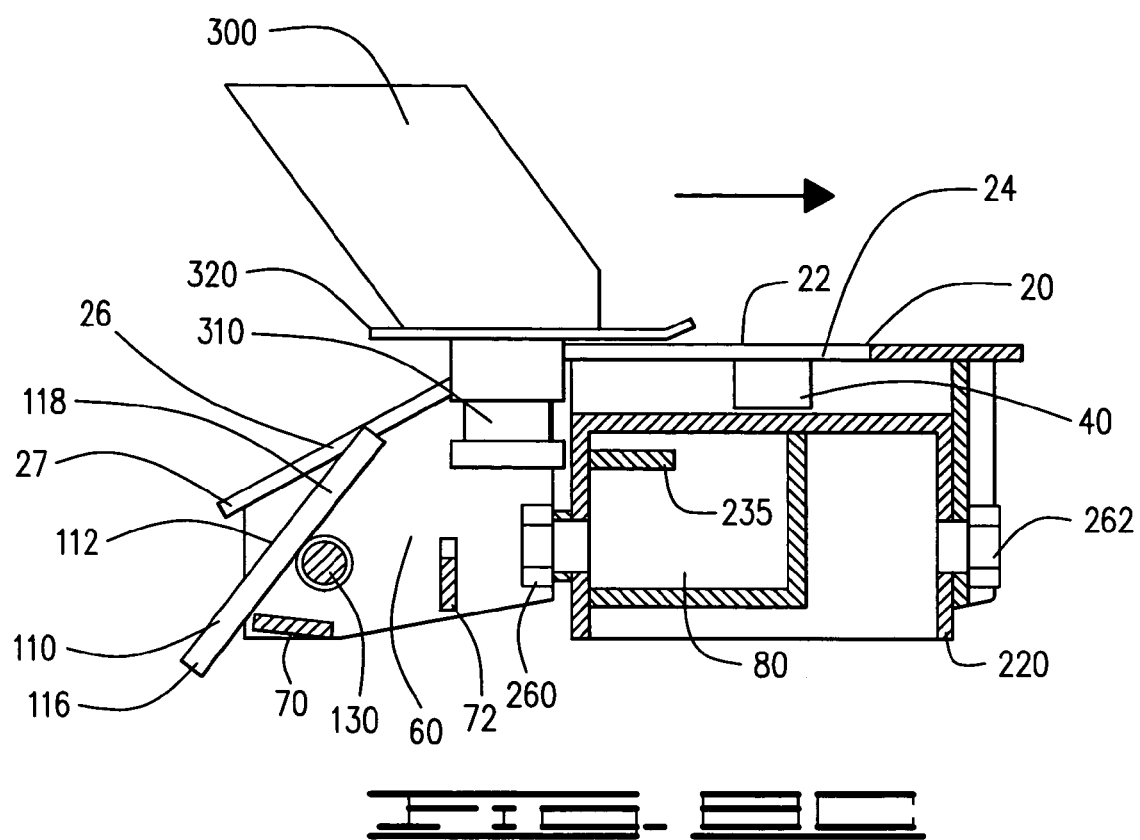

FIGS. 8A through 8C indicate the detachable fifth wheel hitch plate device with a pivotal locking ramp during three stages of the fifth wheel trailer loading process.

IV. DESCRIPTION OF THE PREFERRED EMBODIMENT

Figure 1:
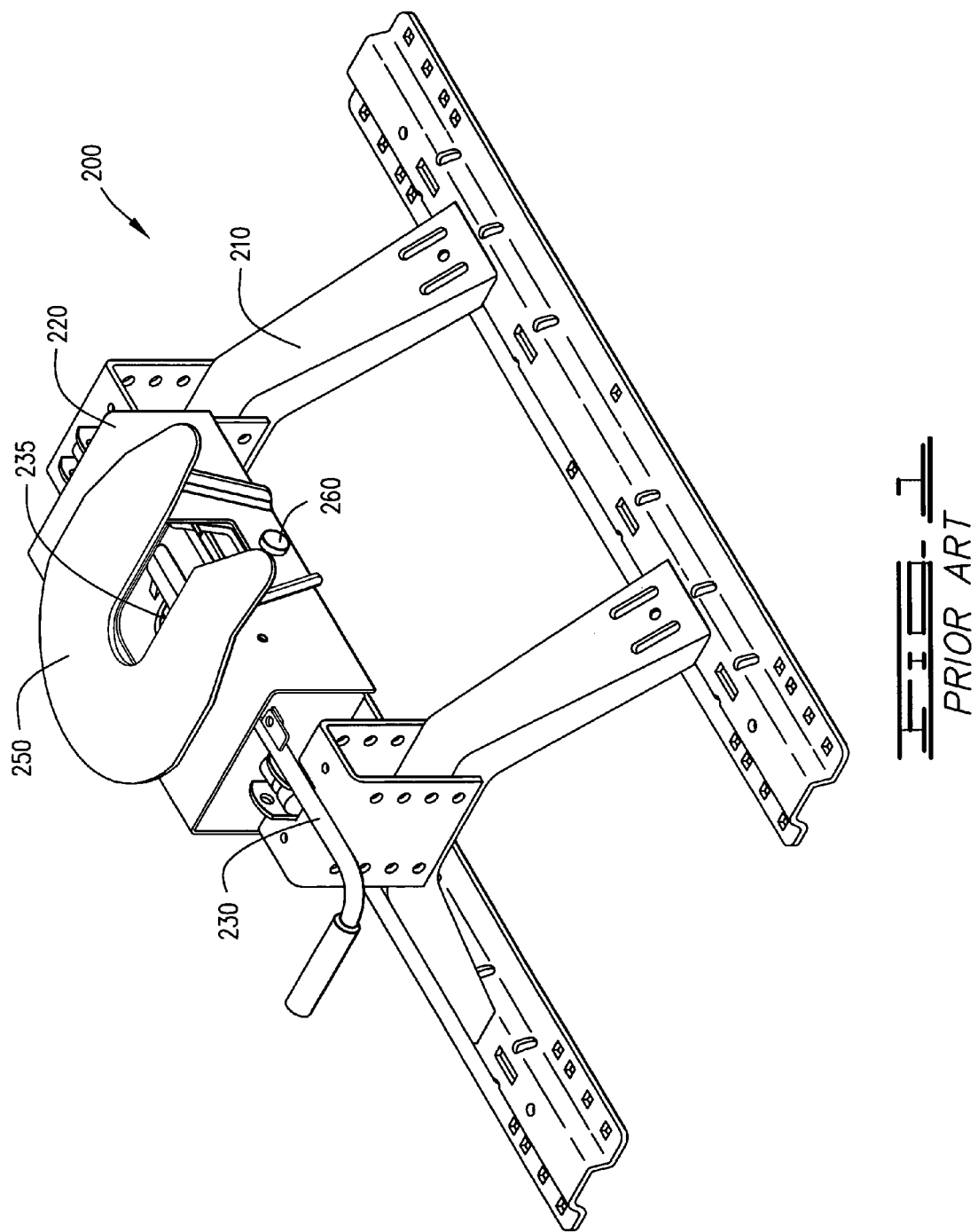
FIG. 1 is a perspective view of the prior art model fifth wheel hitch with the supplied hitch plate assembly which is to be replaced with the improved detachable fifth wheel hitch plate device with a pivotal locking ramp.
Figure 3:
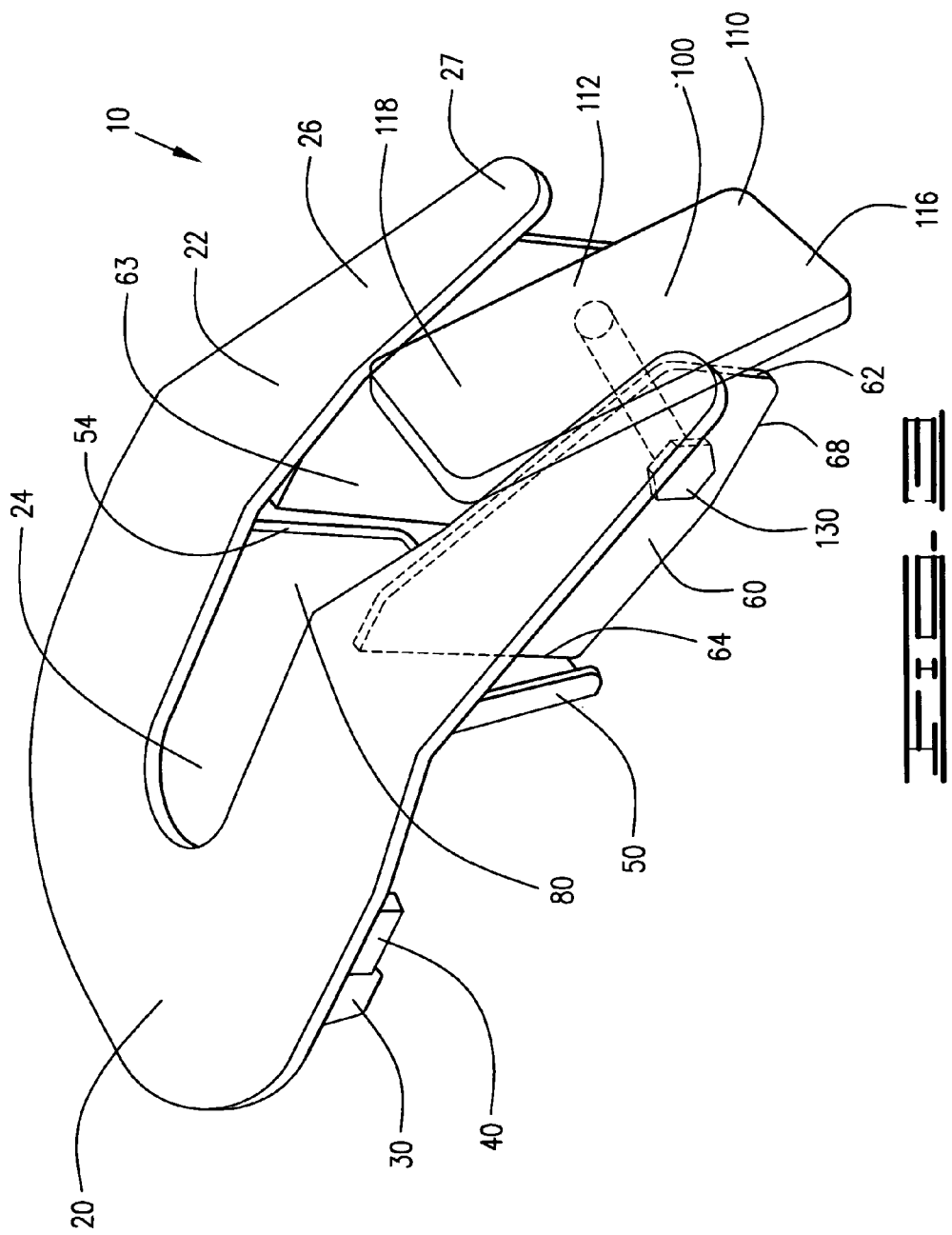
FIG. 3 is an isolated perspective view indicating the detachable fifth wheel hitch plate device with a pivotal locking ramp
Figure 6:
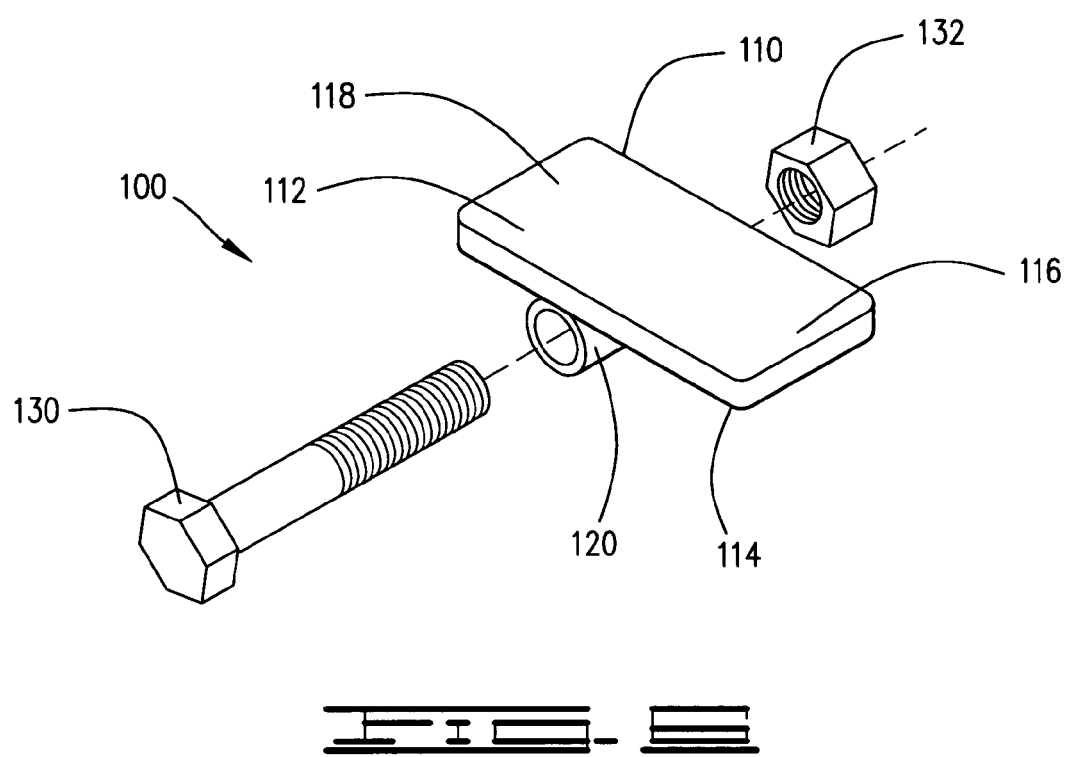
FIG. 6 is a front perspective view of the pivotal locking ramp member and the retaining bolt.

An improved detachable fifth wheel hitch plate device with a pivotal locking ramp member 10 is adapted to a fifth wheel hitch 200 having a cross member locking assembly 220 containing a kingpin locking mechanism 230 with a central kingpin retaining means 235, a fifth wheel hitch base 210 mounted within a bed of a pickup and a supplied hitch plate assembly 250 attached to the cross member locking assembly 220 by a front bolt 260 and a rear bolt 262, indicated in prior art FIG. 1 of the drawings, the improved detachable fifth wheel hitch plate device with a pivotal locking ramp 10 replacing the supplied hitch plate assembly 250, said improved detachable fifth wheel hitch plate device with a pivotal locking ramp member 10 comprising a fifth wheel hitch plate 20 having an upper surface 22, a kingpin receiver slot 24, two extended collar tabs 26 with tapered terminal ends 27, FIG. 3, and a lower surface 28, FIGS. 4 and 5, a rear mounting plate 30 welded to the lower surface 28, said rear mounting plate 30 having a rear mounting aperture 32, a front mounting plate 50 welded to the lower surface 28 of the fifth wheel hitch plate 20, said front mounting plate 50 having a front surface 56, a central mounting aperture 52 and an upper channel notch 54, and two lateral rocker stops 40 welded to the lower surface 28 of the fifth wheel hitch plate 20 in axial alignment between the front mounting plate 30 and rear mounting plate 50, two parallel side channel plates 60 having a front end 62, rear end 64, inner surface 63, upper edge 66, lower edge 68 and a ramp bolt hole 65, the ramp bolt holes 65 of the two side channel plates 60 aligned in a horizontal plane perpendicular to the kingpin receiver slot 24, each rear end 64 of the side channel plate 60 welded perpendicular to the front surface 56 of the front mounting plate 50 on opposing sides of the upper channel notch 54 and also welded along the entire upper edge 66 to the lower surface 28 of the fifth wheel hitch plate 20 along the collar tabs 26 and terminal ends 27 outside the kingpin receiver slot 24, FIGS. 3 and 4, a front stop support 70 welded on the facing inner surface 63 of each side channel plate 60 at the front end 62 and lower edge 68 of each side channel plate 60, a rear stop support 72 welded vertically on the facing inner surface 63 of each side channel plate 60 at the rear end 64 between the upper edge 66 and lower edge 68 of each side channel plate 60, a kingpin receiver channel 80 defined by the kingpin receiver slot 24, the two collar tabs 26, the two side channel plates 60, the front stop support 70 and the rear stop support 72 with the tapered terminal ends 27 extending to the front end 62 along the upper edge 66 of the side channel plates 60, and a pivotal locking ramp member 100, FIG. 6, pivotally attached within the kingpin receiver channel 80 by a ramp bolt 130 secured by a nut 132, said ramp bolt 130 passing through a transverse ramp support 120, pivotally attaching said transverse ramp support 120 and said pivotal locking ramp member 100 within said ramp bolt holes 65 of the side channel plates 60, said transverse ramp support 120 welded to a lower surface 114 of a ramp plate 110, said ramp plate 110 also providing an upper surface 112, a front portion 116 and a rear portion 118, said front portion 116 supported upon said front stop support 70 when the ramp plate 110 is in a tilted position, FIGS. 8A and 8C, and said rear portion 118 supported upon said rear stop support 72 when the ramp plate 110 is a relatively horizontal position, FIG. 8B.

Figure 7:
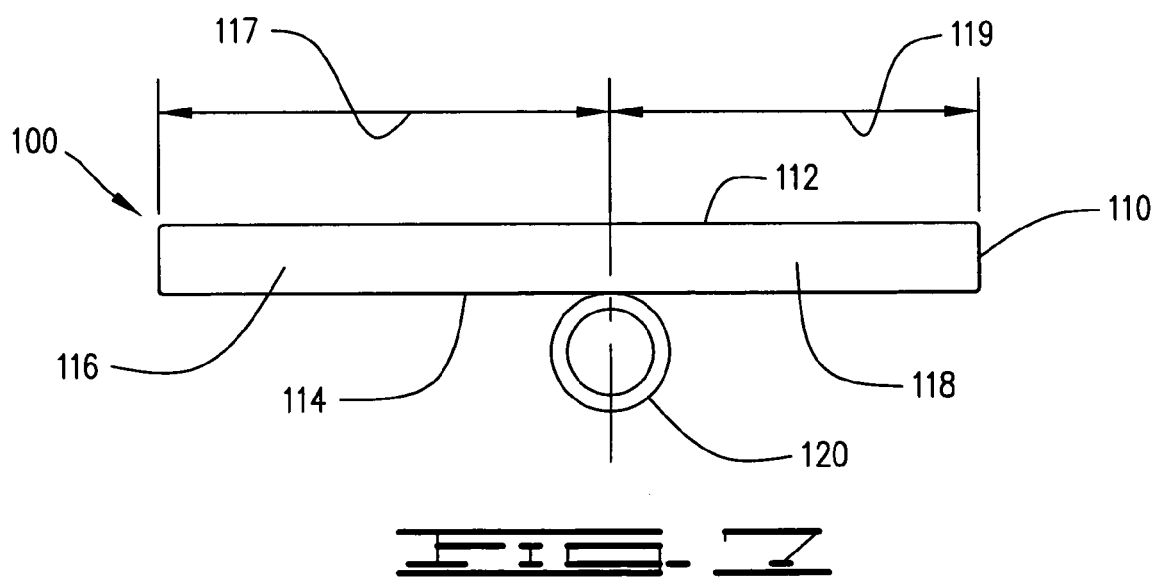
FIG. 7 is a side view of the pivotal locking ramp member indicating the distribution and location of the lower transverse ramp support in relation to the ramp plate.

As further defined, the transverse ramp support 120 is welded to the lower surface 114 of the ramp plate 110 positioned offset more towards the rear portion 118 than the front portion 116, urging the front portion 116 of the ramp plate 110 against the front stop support 70 when no load is upon the upper surface 112 of the ramp plate 110. Most preferably, the front portion 116 would comprise approximately 55% of the length and weighted mass 117 of the ramp plate 110, while the rear portion 118 would comprise 45% of the length and weighted mass 119 of the ramp plate, as indicated in FIG. 7.

Installation of the improved detachable fifth wheel hitch plate device with a pivotal locking ramp member 10 involves removal of the front and rear bolts 260, 262 attaching the supplied hitch plate assembly 250 to the cross member locking assembly 220, removing the supplied hitch plate assembly 250 from the cross member locking assembly 250, placement of the improved detachable fifth wheel hitch plate device with a pivotal locking ramp member 10 upon the cross member locking assembly 220 in the exact location on the cross member locking assembly from where the supplied fifth wheel hitch assembly 250 was removed, replacing the front bolt 260 through the central mounting aperture 52 of front plate 50 of the improved detachable fifth wheel hitch plate device with a pivotal locking ramp member 10, and replacing the rear bolt 262 through the central mounting aperture 32 of the rear mounting plate 30 of the improved detachable fifth wheel hitch plate device with a pivotal locking ramp member 10. The kingpin receiver channel 80 should be directed to the rear of the fifth wheel hitch 200 to receive a kingpin 310 from a fifth wheel trailer 300 to be mounted to the fifth wheel hitch 200.

When the detachable fifth wheel hitch plate device with a pivotal locking ramp member 10 is mounted upon the cross member locking assembly 220 of the fifth wheel hitch 200, the kingpin 310 of the fifth wheel trailer 300 is directed into the kingpin receiver channel 80 as the fifth wheel trailer 300 is being loaded, with the extended collar tabs 26 carrying the weight of a slide plate 320 above the kingpin 310 on the fifth wheel trailer 300 while directing the kingpin 310 onto the upper surface 112 of the front portion 116 of the ramp plate 110, FIG. 8A. At this point, the front portion 116 of the ramp plate 110 is downward, resting against the front stop support 70. As the kingpin 310 is further directed within the kingpin receiver channel 80, the kingpin 310 rides upon the upper surface 112 of the ramp plate 110 within the kingpin receiver slot 24 until it reaches the upper surface 112 of the rear portion 118 of the ramp plate 110, pivoting the rear portion 118 of the ramp plate 110 downward, FIG. 8B. The rear stop support 72 allows the rear portion 118 of the ramp plate 110 to be tilted slightly past horizontal, but prevents the ramp plate 110 from being rotated beyond the rear stop support 72. Once the kingpin 310 is past the ramp plate 110, the ramp plate 110 returns to its rest tilted position, with the front portion 116 of the ramp plate 110 in a lowered position against the front stop support 70, FIG. 8C, the rear portion 118 of the ramp plate 110 blocking the kingpin receiver channel 80 and preventing release of the kingpin 310 from the kingpin receiver channel 80 unless the kingpin 310 and the fifth wheel trailer 300 are raised above the ramp plate 110.

While the detachable fifth wheel hitch plate device with a pivotal locking ramp member 10 has been particularly shown and described with reference to a preferred embodiment thereof, it will be understood by those skilled in the art that changes in form and detail may be made therein without departing from the spirit and scope of the invention.

What is claimed is:

1. An improved detachable fifth wheel hitch plate device with a pivotal locking ramp member, adapted to a fifth wheel hitch having a cross member locking assembly containing a cross member locking mechanism with a central kingpin retaining means, a fifth wheel hitch base mounted within a bed of a pickup and a supplied hitch plate assembly attached to the cross member locking assembly by front and rear bolts replacing the supplied hitch plate assembly, said improved detachable fifth wheel hitch plate device with a pivotal locking ramp member comprising:

a fifth wheel hitch plate having an upper surface, a lower surface, two collar tabs with tapered terminal ends which define a kingpin receiver slot;

a rear mounting plate welded to said lower surface of said fifth wheel hitch plate, said rear mounting plate having a central aperture;

two lateral rocker tabs welded to said lower surface in alignment on each side of the kingpin receiver slot;

a front mounting plate welded to said lower surface of said fifth wheel hitch plate, said front mounting plate having a front surface, a central aperture and an upper channel notch;

two side channel plates, each side channel plate having an upper edge welded to said lower surface of said fifth wheel plate, a rear end welded to said front surface of said front mounting plate, each said side channel plate further including a front end, an inner surface, a ramp bolt hole and a lower edge;

a front stop support welded to said inner surface of each facing side channel plate at said front end and said lower edge of each said side channel plate;

a rear stop support welded vertically to said inner surface of each facing side channel plate at said rear end between said upper edge and said lower edge of each said side channel plate;

a kingpin receiver channel defined by said kingpin receiver slot, said collar tabs, said two side channel plates, said front stop support and said rear stop support with said tapered terminal ends welded to said front end completely along said upper edge of said side channel plates; and a pivotal locking ramp member comprising a ramp plate having an upper surface, a front portion, a rear portion and a lower surface to which is welded a transverse ramp support, wherein a ramp bolt pivotally attaches said transverse ramp support between said ramp bolt holes of said side channel plates, said ramp bolt secured by a nut, allowing the pivotal locking ramp member to pivot within said kingpin receiver channel during the loading process of a kingpin of a fifth wheel trailer within the fifth wheel hitch with said improved detachable fifth wheel hitch plate device.

2. The improved device with a pivotal locking ramp member, as disclosed in claim 1, wherein said transverse ramp support is welded to said lower surface of said ramp plate offset more towards said rear portion than said front portion, urging said front portion of the ramp plate against the front stop support when no load is upon the upper surface of the ramp plate, said front portion supported upon said front stop when said ramp plate is in a tilted position and said rear portion is supported upon said rear stop when said ramp plate is an a relatively horizontal position.

3. The improved device with a pivotal locking ramp member, as disclosed in claim 1, wherein said transverse ramp support is welded to said lower surface of said ramp plate offset more towards said rear portion than said front portion, urging said front portion of the ramp plate against the front stop support when no load is upon the upper surface of the ramp plate, said front portion supported upon said front stop when said ramp plate is in a tilted position and said rear portion is supported upon said rear stop when said ramp plate is an a relatively horizontal position, said front portion comprising approximately 55% of the weighted mass in front of said transverse ramp support, while said rear portion comprises approximately 45% of the weighted mass to the rear of said transverse ramp support.

* * * * *